(12) United States Patent
Carlson et al.

(10) Patent No.: US 8,447,319 B2
(45) Date of Patent: *May 21, 2013

(54) SYSTEM AND METHOD FOR LOCATING UMTS USER EQUIPMENT USING MEASUREMENT REPORTS

(75) Inventors: John Carlson, Dulles, VA (US); Tariqul Islam, Germantown, MD (US); Selcuk Mazlum, Leesburg, VA (US)

(73) Assignee: Andrew LLC, Hickory, NC (US)

( * ) Notice: Subject to any disclaimer, the term of this patent is extended or adjusted under 35 U.S.C. 154(b) by 1139 days.

This patent is subject to a terminal disclaimer.

(21) Appl. No.: 12/104,250

(22) Filed: Apr. 16, 2008

(65) Prior Publication Data
US 2009/0131073 A1 May 21, 2009

Related U.S. Application Data

(60) Provisional application No. 60/996,412, filed on Nov. 15, 2007.

(51) Int. Cl.
*H04W 24/00* (2009.01)
(52) U.S. Cl.
USPC .................. 455/456.1; 455/404.2; 455/456.2
(58) Field of Classification Search .... 455/456.1–456.2, 455/404.2
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang et al. | |
| 5,218,618 A | 6/1993 | Sagey | |
| 5,245,634 A | 9/1993 | Averbuch | |
| 5,317,323 A | 5/1994 | Kennedy et al. | |
| 5,327,144 A | 7/1994 | Stilp et al. | |
| 5,365,544 A | 11/1994 | Schilling | |
| 5,372,144 A | 12/1994 | Mortier et al. | |

(Continued)

FOREIGN PATENT DOCUMENTS

| | | |
|---|---|---|
| WO | 2008/016944 A2 | 2/2008 |
| WO | 2008/097995 A1 | 8/2008 |
| WO | 2009/129344 A1 | 10/2009 |

OTHER PUBLICATIONS

International Searching Authority, International Search Report in related International Application No. PCT/US2008/083594, mailed Feb. 12, 2009, p. 1-2.

(Continued)

*Primary Examiner* — Anthony Addy
*Assistant Examiner* — Tangela T. Chambers
(74) *Attorney, Agent, or Firm* — Duane Morris LLP

(57) ABSTRACT

A system and method for estimating a location of a wireless device receiving signals from a plurality of nodes of a communication system. A first value may be determined based on a network timing characteristic for one of the nodes, and a second value may be determined based on a network measurement report characteristic. An observed time difference of arrival ("OTDOA") hyperbola may then be calculated based on the first and second values, and a location of the wireless device estimated as a function of the OTDOA hyperbola.

54 Claims, 8 Drawing Sheets

U.S. PATENT DOCUMENTS

| | | |
|---|---|---|
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,788,253 B1 * | 9/2004 | Calin .......................... 342/464 |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,127,257 B2 | 10/2006 | Riley et al. |
| 7,155,244 B2 | 12/2006 | Edge |
| 7,167,713 B2 | 1/2007 | Anderson |
| 7,271,765 B2 | 9/2007 | Stilp et al. |
| 7,315,745 B2 | 1/2008 | Duffett-Smith et al. |
| 7,340,259 B2 | 3/2008 | Maloney |
| 7,383,049 B2 | 6/2008 | Deloach, Jr. et al. |
| 7,427,952 B2 | 9/2008 | Bull et al. |
| 7,440,762 B2 | 10/2008 | Maloney et al. |
| 7,593,738 B2 | 9/2009 | Anderson |
| 2001/0039192 A1 * | 11/2001 | Osterling et al. ............. 455/456 |
| 2001/0051526 A1 * | 12/2001 | Ruutu et al. ................ 455/456 |
| 2002/0077116 A1 | 6/2002 | Havinis et al. |
| 2002/0107028 A1 * | 8/2002 | Rantalainen et al. ......... 455/456 |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0148774 A1 | 8/2003 | Naghian et al. |
| 2003/0190919 A1 | 10/2003 | Niemenmaa |
| 2003/0203738 A1 | 10/2003 | Brown et al. |
| 2004/0032836 A1 | 2/2004 | Grilli et al. |
| 2004/0037246 A1 | 2/2004 | Grilli et al. |
| 2004/0043775 A1 | 3/2004 | Kennedy, Jr. et al. |
| 2004/0087277 A1 | 5/2004 | Edge et al. |
| 2004/0132464 A1 | 7/2004 | Poykko et al. |
| 2004/0132466 A1 | 7/2004 | Kennedy, Jr. et al. |
| 2004/0180645 A1 | 9/2004 | Bussan et al. |
| 2004/0180671 A1 | 9/2004 | Spain, Jr. |
| 2004/0203921 A1 | 10/2004 | Bromhead et al. |
| 2004/0218664 A1 | 11/2004 | Kennedy, Jr. et al. |
| 2004/0235495 A1 * | 11/2004 | Bar et al. .................. 455/456.1 |
| 2004/0252752 A1 | 12/2004 | Kennedy, Jr. et al. |
| 2005/0058182 A1 | 3/2005 | Kennedy, Jr. et al. |
| 2005/0135530 A1 | 6/2005 | Joo et al. |
| 2005/0136938 A1 * | 6/2005 | Kang ........................ 455/456.1 |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kenney, Jr. et al. |
| 2006/0239391 A1 | 10/2006 | Flanagan |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0096566 A1 * | 4/2008 | Brunner et al. ................ 455/437 |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |

| | | | |
|---|---|---|---|
| 2008/0261614 | A1 | 10/2008 | Mia et al. |
| 2008/0285505 | A1* | 11/2008 | Carlson et al. ............... 370/328 |
| 2008/0287139 | A1* | 11/2008 | Carlson et al. ............. 455/456.1 |
| 2008/0287140 | A1* | 11/2008 | Lee et al. ................... 455/456.2 |
| 2009/0005061 | A1 | 1/2009 | Ward et al. |

OTHER PUBLICATIONS

International Searching Authority, International Search Report for International application No. PCT/US08/60120 (cross-referenced foreign application), Date of Mailing: Jun. 30, 2008, Form PCT/ISA/220 & Form PCT/ISA/210(sheet one and sheet two).

International Searching Authority, International Search Report for International application No. PCT/US08/60109 (cross-referenced foreign application), Date of Mailing: Jun. 30, 2008, Form PCT/ISA/220 & Form PCT/ISA/210(sheet one and sheet two).

* cited by examiner

SYSTEM AND METHOD FOR LOCATING UMTS USER EQUIPMENT USING MEASUREMENT REPORTS

RELATED APPLICATIONS

The instant application is with and claims the priority benefit of Provisional Application No. 60/996,412, filed Nov. 15, 2007, entitled "Locating UMTS UE Using Measurement Reports," by the same inventors, the entirety of which is incorporated herein by reference.

The instant application is co-pending with and related to U.S. application Ser. No. 11/749,095, filed May 15, 2007, entitled "System and Method for Estimating the Location of a Mobile Station in Communications Networks," the entirety of which is incorporated herein by reference. The instant application is co-pending with and related to U.S. application Ser. No. 11/749,101, filed May 15, 2007, entitled "System and Method for Network Timing Recovery in Communications Networks," the entirety of which is incorporated herein by reference.

BACKGROUND

A number of applications currently exist within communication systems, such as those supporting Global System for Mobile Communication ("GSM"), Time Division Multiple Access ("TDMA"), Code Division Multiple Access ("CDMA"), Orthogonal Frequency Division Multiple Access ("OFDMA") and Universal Mobile Telecommunications System ("UMTS") technologies, for which location solutions are needed by mobile units, mobile stations, user equipment ("UE") or other devices and by other entities in a wireless network. Examples of such applications may include, but are not limited to, GSM positioning and assisted global position system ("A-GPS") positioning. A-GPS adaptable UE may acquire and measure signals from a number of satellites to obtain an accurate estimate of the UE's current geographic position. GPS-based solutions may offer excellent accuracy, but GPS-based solutions generally suffer from yield issues in indoor environments or in environments that provide a poor line of sight to the open sky in which to best receive GPS satellite transmissions. Furthermore, embedding GPS chipsets into UE may also add an associated cost to the manufacturing of the UE and an associated cost to A-GPS functionality in the respective communications network. Further, some organizations are hesitant to offer a positioning method solely based upon the availability of a satellite network controlled by the United States government.

There, however, exists a need in the art to locate UMTS, OFDMA or W-CDMA mobile devices to satisfy FCC E-911 regulations as well as to provide Location Based Services for mobile phone users. The 3GPP UMTS standard outlines several methods for location including Cell-ID, A-GPS, Observed Time Difference of Arrival ("OTDOA"), and Uplink (Time Difference of Arrival ("U-TDOA"). Cell-ID generally is the simplest method which provides coarse positioning of mobile devices based on a known location of the coverage area centroid of each base station sector. Additionally, A-GPS is a straightforward implementation for network and handset manufacturers due to their legacy in CDMA2000 networks. Likewise, U-TDOA is also a straightforward technique for those skilled in the art and has been widely deployed for other air standards. OTDOA, on the other hand, is confronted with significant implementation challenges for network carriers, due to the fact that the base station timing relationships must be known, or measured, for this technique to be viable. For unsynchronized UMTS networks, where the base station timing is not locked to a common timing source, the 3GPP standard offers the suggestion that base station Location Measurement Units ("LMUs") or Network Synchronization Units ("NSUs") may be utilized to recover this timing information. Once the base station timing relationships are measured, the handset measurements of Observed Time Difference ("OTD") between various base stations may be translated into absolute range differences from which position can be calculated (e.g., through UE-based or UE-assisted methods).

Network carriers, however, appear to have little interest in implementing the OTDOA solution. This may be due to a general lack of cost-effective solutions for practical implementations of OTDOA in unsynchronized UMTS networks, significant hardware, installation, testing, and associated maintenance costs, and/or a lack of available LMU or NSU vendors. Further, the lack of interest by network carriers in implementing the OTDOA solution may also be due to a lack of handset manufacturers implementing OTDOA measurements into the associated firmware, negative perception of OTDOA due to the potential network capacity impacts if Idle Period Downlink ("IPDL") is enabled by carriers, and/or carrier perception that A-GPS handsets will meet all the location needs of its users.

The UMTS standard offers alternative location solutions for UE location. OTDOA technologies, with or without IPDL, have been developed and integrated into the UMTS standard as optional features to enable location of UEs. However, UMTS carriers have been reluctant to adopt these technologies because carriers had not initially requested these optional features in most UE devices. Additionally, concern may exist regarding the impact OTDOA may have on the operation of a communications network including call quality and network capacity. Because widespread adoption of OTDOA may require modifications in both the base stations and mobile stations, network providers are generally more interested in a solution that operates with existing mobile devices and base stations.

Embodiments of the present subject matter therefore provide a novel method and system to derive OTDOA information from the existing mobile devices and base stations utilizing messages typically used for normal operation of the mobile device. For example, measurement report messages, e.g., network measurement reports, are generally utilized for managing handover. UMTS mobile devices report these messages to a base station for proper operation. These messages contain the Connection Frame Number ("CFN")—System Frame Number ("SFN") information between serving and neighbor nodes, such as, but not limited to, base stations, base station sectors, cells, etc. Embodiments of the present subject matter may also derive a neighboring node's SFN-SFN OTD from this information. Moreover, if the neighboring SFN times are known, OTDOAs of the neighboring node downlink, and thus the location of the UMTS device, may be determined. Embodiments of the present subject matter may therefore make it possible to determine downlink OTDOA values for mobile devices that do not support the OTDOA feature through the exploitation of network measurement reports that are generally not intended for location determination.

Accordingly, there is a need for a method and system for locating UMTS user equipment using measurement reports. Therefore, an embodiment of the present subject matter provides a method for estimating a location of a wireless device. The method comprises the steps of determining an OTDOA based solely on signals received from plural nodes and determining the OTDOA using information received from a network measurement report.

Another embodiment of the present subject matter provides a method for estimating a location of a wireless device. The method comprises the steps of determining an OTDOA based solely on signals received from plural nodes and from signals received from a satellite navigation system and determining the OTDOA using information received from a network measurement report.

A further embodiment of the present subject matter provides a method for estimating a location of a wireless device receiving signals from a plurality of nodes of a communication system. The method comprises the steps of determining a first value based on a network timing characteristic for one of the nodes and determining a second value based on a network measurement report characteristic. An OTDOA hyperbola based on the first and second values may be determined, and a location of the wireless device estimated as a function of the OTDOA hyperbola.

An additional embodiment of the present subject matter provides a method for estimating a location of a wireless device receiving signals from a serving node, a first neighboring node, and a second neighboring node, where each node is a node of a communication system. The method comprises the steps of determining a first value based on a first network timing characteristic for the first neighboring node and determining a second value based on a second network timing characteristic for the second neighboring node. A third value may be determined based on a third network timing characteristic for the serving node, and a fourth value may be determined based on a first network measurement report characteristic. A fifth value may be determined based on a second network measurement report characteristic, and an OTDOA hyperbola calculated based on at least one of the first, second, third, fourth, or fifth values. A location of the wireless device may then be estimated as a function of the OTDOA hyperbola. Alternative embodiments of the present subject matter may calculate the OTDOA hyperbola by calculating a difference between the first and second values, calculating a difference between the first and third value, or calculating a difference between the fourth and fifth values. Yet another embodiment of the present subject matter may calculate the OTDOA hyperbola by calculating a first OTDOA hyperbola based on at least one of the first or second values, and at least on one of the fourth or fifth values, and calculating a second OTDOA hyperbola based on at least one of the first or third values, and on the fourth value.

Another embodiment of the present subject matter provides a system for estimating a location of a wireless device receiving signals from a plurality of nodes of a communication system. The system may comprise circuitry for determining a first value based on a network timing characteristic for one of the nodes, and circuitry for determining a second value based on a network measurement report characteristic. The system may further comprise circuitry for calculating an OTDOA hyperbola based on the first and second values, and circuitry for estimating a location of the wireless device as a function of the OTDOA.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
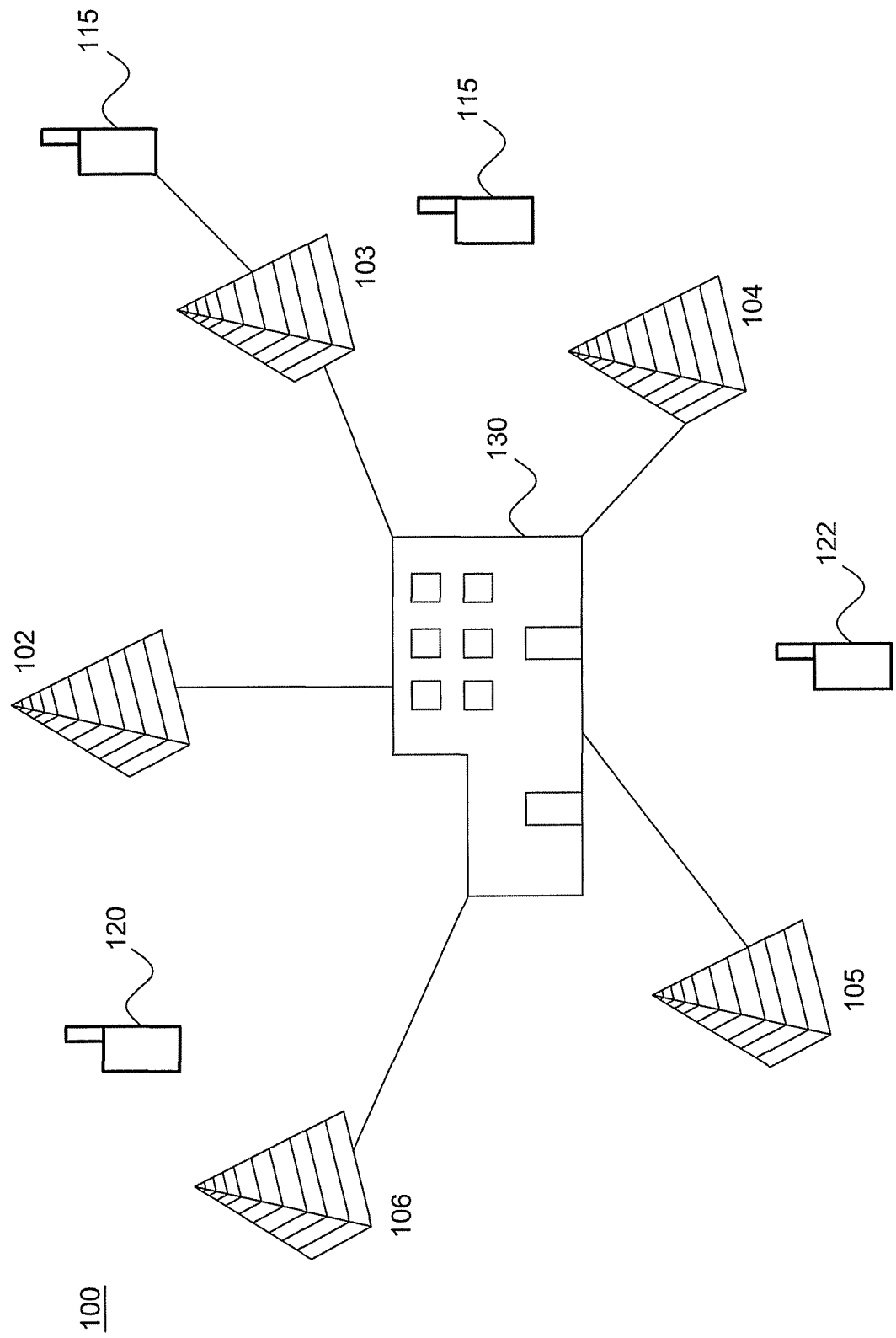
FIG. 1 is an illustration of a wireless communications network according to an embodiment of the present subject matter.

With reference to the figures where like elements have been given like numerical designations to facilitate an understanding of the present subject matter, the various embodiments of a system and method for locating UMTS user equipment using measurement reports are herein described. It should be noted that the terms "device," "handset," "unit" and "station" are utilized interchangeably through the present disclosure and such use is not intended to limit the scope of the claims appended herewith.

Embodiments of the present subject matter may provide several methods to derive timing information. Thus, once the timing relationships are known, the positions of either the same mobile device or other mobile devices may be determined completely, or partly, from calculated hyperbolas, from observed time differences ("OTDs"), or from other values. This aspect of the present subject matter provides that location capability may be available to non-A-GPS handsets in a network and that high volume mobile device location may be easily computed through existing network measurement reports without consuming the time, battery, and/or network capacity associated with A-GPS position estimation. The latter is a sought after requirement for enhanced network optimization utilizing geo-coded measurements, as well as for security applications requiring frequent position updates for all active users in a network. Another aspect of the present subject matter may also provide an accurate fallback location method when other methods, such as A-GPS, fail. It is anticipated that A-GPS yield will be poor in areas where open-sky conditions do not exist, e.g., indoors and urban environments. While A-GPS is designed to improve yield in such conditions, many scenarios exist in where A-GPS may not provide enough gain over conventional GPS to produce a successful A-GPS fix. Furthermore, timing relationships may tend to drift over time as a function of oscillator characteristics utilized in respective base stations. This drift must be accounted for when utilizing these methods, either through periodic updating of the estimated base station time relationships (base station timing offsets or "BSTOs") or through known means to track and predict timing relationships via prediction methods based on past measurement timing trends. Exemplary means of prediction are well-known in the industry and are a manageable problem to those skilled in the art, and will thus not be the subject of further discussion herein.

OTDs generally define a set of handset based measurements known in the 3GPP standard such as System Frame Number "SFN-SFN" Type 1 and/or Type 2. These measurements are generally the observed time difference of two nodes such as base station cells or sectors and differ primarily in the timing resolution of the measurements. For example, with Type 1, a mobile device measures the timing difference between the Primary Common Control Physical Channels ("P-CCPCH") of cell 1 and cell 2. Type 1 is generally available on a CELL_FACH connection. While a soft handover cannot be performed while on a CELL_FACH connection, the network may request the mobile device to measure the timing difference between cell 1 and cell 2. While on a CELL_FACH connection, a Measurement Control Message may be sent to the mobile device on the Forward Access Channel ("FACH"), and the mobile device's measurement results are returned on the Reverse Access Channel ("RACH"). With Type 2, the mobile device measures the timing difference between the Common Pilot Channels ("CPICH") of cell 1 and cell 2. Type 2 is applicable to both CELL_DCH and CELL_FACH connections. With either connection type, if there is power in cell 2, the mobile may measure the timing difference between the two cells. While on a CELL_DCH connection, the mobile device may measure OTDs while in soft handover with cells 1 and 2. Another set of handset based measurements known in the 3GPP standard is SFN-Connection Frame Number ("CFN"). These measurements refer to the observed time difference between the connection to a current serving base station cell and some set of handset-measurable, neighboring cells or sectors.

One solution to obtain a cell or node's SFN timing may be to synchronize the respective base stations with GPS or other comparable techniques. If network carriers find this option justifiable, then network synchronization units ("NSUs") may not be necessary. When base stations are not synchronized, the techniques described in co-pending U.S. application Ser. No. 11/749,095 and co-pending U.S. application Ser. No. 11/749,101, both filed May 15, 2007, the entirety of each incorporated herein by reference, may be utilized. While an NSU based method is described below, such an example should not in any way limit the scope of the claims appended herewith.

One NSU based solution may provide a GPS trained NSU at one or more base stations within a communications network. The NSU may have knowledge of the co-located site's scrambling code and may also continuously estimate the timing of the downlink frame marker. When embodiments of the present subject matter employ chip offset (0-38399) information of the rounded frame and chip offset term in the network measurement report, absolute SFN timing within 256 frames may not be required. Therefore, knowledge of frame timing markers (having a period of 38400 chips (10 ms)) may generally be adequate for this purpose. In one embodiment of the present subject matter, SFN timing information may be maintained in a timing bank to provide accurate timing relationships of neighbor SFNs at appropriate measurement reporting times. Of course, embodiments of the present subject matter employed in OFDMA based systems utilize sampling time, $T_S$, as the time unit. In such OFDMA based systems the timing offset would be a sample offset rather than a chip offset. Therefore, chip offset, timing offset, sample offset may be utilized interchangeably throughout the present disclosure and the use of one term without the others should not in any way limit the scope of the claims appended herewith. As embodiments of the present subject matter are not directly dependent of SFN, these certain embodiments may be employed in systems operating under the Long Term Evolution ("LTE") standard, by way of a non-limiting example, and frame offset or frame marker offset would be equally applicable thereto. Therefore, SFN, frame offset, and frame marker offset may be utilized interchangeably throughout the present disclosure and the use of one term without the others should not in any way limit the scope of the claims appended herewith.

Another embodiment of the present subject matter may employ a sparse deployment of NSUs to reduce hardware deployment cost and track SFN timing. For example, a GPS trained NSU, preferably within line of sight of one or more base stations and positioned at a known location, may measure the timing of several scrambling codes associated with one or more neighboring cells or nodes. With knowledge of the precise location of the base stations and the NSU, SFN timing at the neighboring sites may then be determined. Further, as some of the downlink signals may be detected at multiple NSUs, multipath may also be resolved by selecting the earliest SFN timing of a base station.

Multiples of 256 chips timing offset between different sectors of a base station may assist in identifying the scrambling code group of a base station. However, when the grouping of the scrambling code is known, the modulo 256 chip timing offset characteristics may assist in determining the SFN timing for co-located sectors if the timing of only one sector is known. This latter technique may, of course, be utilized for sparse NSU deployments.

In an alternative embodiment of the present subject matter, the sparse NSU deployment approach may be useful in locating unknown base stations. For example, where the location of one or more base stations is not readily available from the carrier, the downlink of a particular base station may be detected at multiple NSU sites, and the base station may then be located with the downlink TDOA information.

For determination of observed time difference of arrivals ("OTDOAs"), frame offset and chip offset of the neighboring nodes or cells may be generally reported in a measurement report such as a network measurement report. The chip offset, $T_m$, may generally be required for OTDOA computation. In certain embodiments of the present subject matter, a shift of 38400 chips may be added or subtracted to align the frame markers as necessary. As discussed above, embodiments of the present subject matter employed in OFDMA based systems may utilize sampling time, $T_S$, as an appropriate time unit.

When the serving sector is the only sector reported in a measurement report, i.e., when none of the co-located sectors are reported as neighboring cells, the chip offset of the serving site may be considered as zero. This assumption is analogous to that of $\alpha=0$, when the Rx-Tx time difference is 1024 chips. User equipment ("UE") Rx-Tx time difference may generally be defined as the difference in time between the UE uplink dedicated physical control channel ("UL DPCCH") frame transmission and the first detected path (in time) of the downlink dedicated physical channel ("DL DPCH") or fractional dedicated physical channel ("F-DPCH") frame from the measured radio link. For the serving site, the nominal value of this parameter is 1024 chips, and its range may be from 876 chips to 1172 chips.

FIG. 1 is an illustration of an exemplary wireless communications network according to an embodiment of the present subject matter. With reference to FIG. 1, a wireless communications network 100 or system is shown. The network may be a Global System for Mobile Communication ("GSM") network, a Time Division Multiple Access ("TDMA") network, Code Division Multiple Access ("CDMA") network, a UMTS network, an Orthogonal Frequency Division Multiple Access ("OFMDA") network, a Worldwide Interoperability for Microwave Access ("WiMax") network, a WiFi network, networks utilizing Evolution-Data Optimized ("EDVO"), CDMA2000 network, 1 times Radio Transmission Technology ("1xRTT"), Long Term Evolution ("LTE") standards or another equivalent network.

Location measurement units ("LMU") and/or NSUs 115 may be dispersed throughout the system or subsystem reception area. NSUs 115 may be integrated with one or more base stations 102-106 or may be independent of a base station 102-106 and may be sparsely deployed through the network 100. The wireless network 100 serves mobile stations, UE or devices 120, 122 within reception range of at least one of the base stations 102-106. Mobile stations 120, 122 may include cellular telephones, text messaging devices, computers, portable computers, vehicle locating devices, vehicle security devices, communication devices, wireless transceivers or other devices with a wireless communications interface. Base station transceivers 102-106, also commonly referred to simply as base stations, may be operably connected to a central entity or central network unit 130. The central entity 130 may be a base station controller ("BSC") in a base station subsystem ("BSS"), a Radio Network Controller ("RNC") in a Radio Access Network ("RAN"), or, for GSM, General Packet Radio Service ("GPRS") or UMTS system, a serving mobile location center ("SMLC") or an equivalent. The connection from each base station to a BSC, SMLC or other central network entity may employ a direct transmission link, e.g., a wired connection, microwave link, Ethernet connection, and the like, or may be employed by one or more intermediate entities, e.g., an intermediate BSC in the case of a connection from a BTS to an SMLC for GSM.

Each mobile station 120, 122 may periodically measure the transmission timing difference between pairs of base stations 102-106 and/or receive network measurement reports from the network 100. For example, a mobile station 120 may measure the difference in transmission timing for communication from its serving base station 102 and from one or more neighboring base stations, e.g., 106 and/or 103. Either the mobile station or the base station may remove differences attributed primarily to propagation delays between the mobile station and base station antennas to produce a timing difference, determining timing relationships, and/or determine other values or characteristics.

Figure 2:
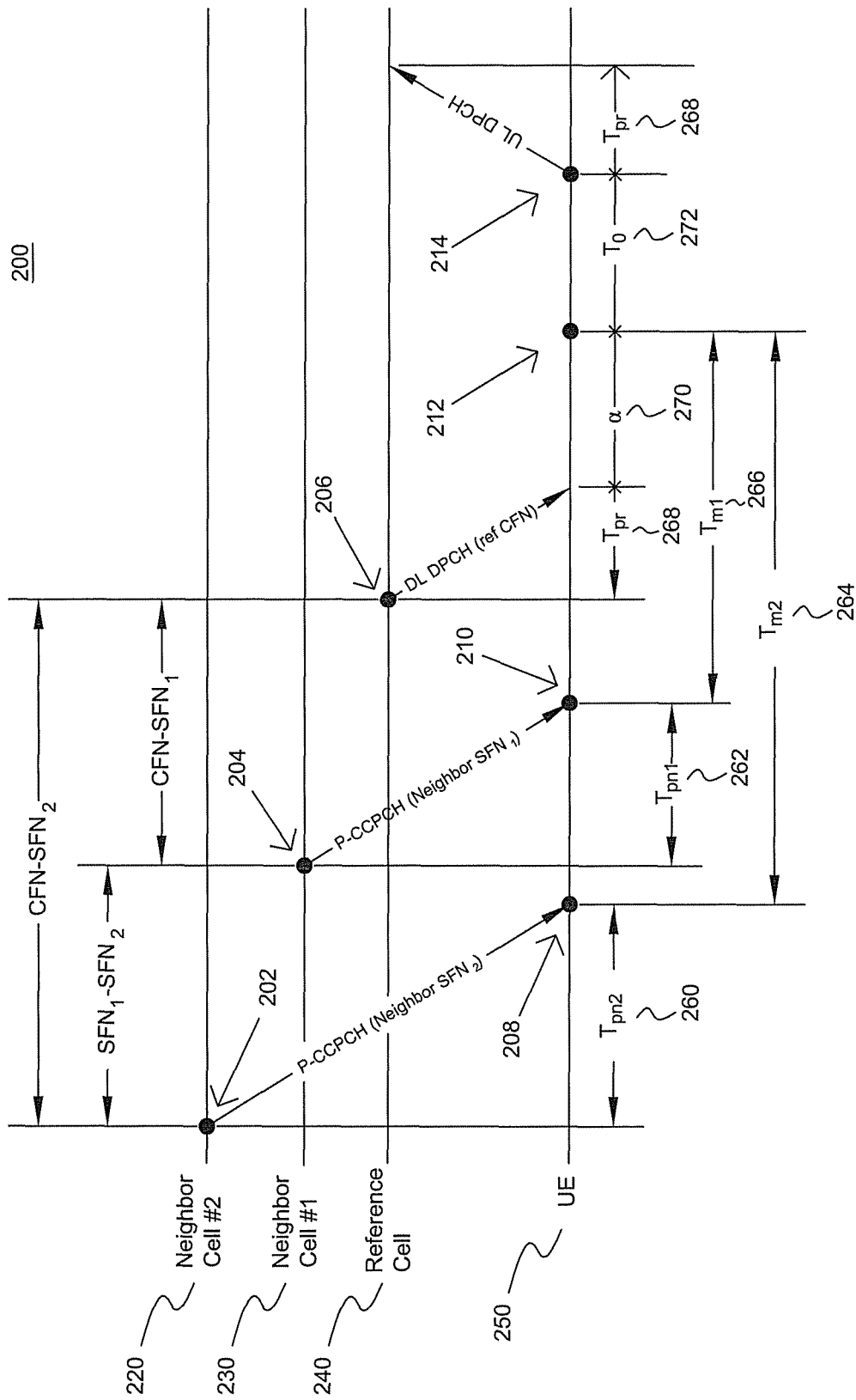
FIG. 2 is an illustration of timing relationships according to an embodiment of the present subject matter.

FIG. 2 is an illustration of timing relationships according to an embodiment of the present subject matter. With reference to FIG. 2, timing relationships 200 between an exemplary mobile device or a UE and one or more nodes or cells are shown. $T_{TxSFN2}$ 202 represents the $SFN_2$ transmit time measured by an NSU. $T_{TxSFN1}$ 204 represents the $SFN_1$ transmit time measured by an NSU. $T_{TxCFN}$ 206 represents the CFN transmit time measured by an NSU. $T_{UETx}$-$T_0$ 212 represents the nominal DL DPCH timing generally referred to as DL $DPCH_{nom}$. $T_{RxSFN2}$ 208 represents the time at the beginning of the second neighbor cell or node 220 primary common control physical channel ("P-CCPCH") frame received most recently in time before the time instant $T_{UETx}$-$T_0$ 212 at the UE 250. $T_{RxSFN1}$ 210 represents the time at the beginning of the first neighbor cell or node 230 P-CCPCH frame received most recently in time before the time instant $T_{UETx}$-$T_0$ 212 at the UE 250. $T_{UETx}$ 214 represents the time when the UE 250 transmits an UL DPCH.

With continued reference to FIG. 2, $T_{pn2}$ 260 represents the one way propagation delay from the second neighbor node or cell 220 to the UE 250. It follows that $T_{pn1}$ 262 represents the one way propagation delay from the first neighbor node or cell 230 to the UE 250. Accordingly, $T_{pr}$ 268 represents the one way propagation delay from the reference node or cell 240, such as a serving node or cell, to the UE 250. $T_{m1}$ 266 represents the chip offset or difference between $T_{RxSFN1}$ 210 and DL $DPCH_{nom}$. $T_{m2}$ 264 represents the chip offset or difference between $T_{RxSFN2}$ 208 and DL $DPCH_{nom}$. Of course, $T_{m1}$ 266 and $T_{m2}$ 264 generally provide a range from 0 to 38399 chips. $T_0$ 270 represents the nominal difference between the first received DPCH finger and $T_{UETx}$ 214 at the UE 250. Generally, $T_0$ 270 may be a constant of 1024 chips. α 260 represents the first received DL DPCH finger relative to DL $DPCH_{nom}$.

The following equations arithmetically illustrate the timing relationships between the UE 250 and the nodes 220, 230, 240 shown in FIG. 2:

$$T_{TxCFN} - T_{UETx} = T_{pr} + α + T_0 \quad (1)$$

$$T_{TxSFN1} - T_{UETx} = T_{pn1} + T_{m1} + T_0 \quad (2)$$

$$T_{TxSFN2} - T_{UETx} = T_{pn2} + T_{m1} + T_0 \quad (3)$$

An equation of a first hyperbola may then be derived from subtracting Equation (3) from Equation (2) to obtain the following relationship:

$$T_{pn2} - T_{pn1} = (T_{TxSFN2} - T_{TxSFN1}) + (T_{m1} - T_{m2}) \quad (4)$$

Equation 4 generally represents a hyperbola between the first and second neighboring nodes or cells 220, 230. $T_{TxSFN2}$ 202 and $T_{TxSFN1}$ 204 may be measured by an NSU, and $T_{m1}$ 266 and $T_{m2}$ 264 may be obtained from a network measurement report.

An equation of a second hyperbola may be derived from subtracting Equation (2) from Equation (1) to obtain the following relationship:

$$T_{pn1} - T_{pr} = (T_{TxSFN1} - T_{TxCFN}) + (α - T_{m1}) \quad (5)$$

Equation 5 generally represents a hyperbola between the reference or serving node or cell 240 and the first neighboring node or cell 230. $T_{TxSFN1}$ 204 and $T_{TxCFN}$ 206 may be measured by an NSU, and $T_{m1}$ 266 may be obtained from a network measurement report. α 270 may be unknown, but is likely to be close to zero. For example, when the UE 250 is in synchronization with the serving cell 240, the UE Rx–Tx time difference is 1024 chips and α 270 is zero. The synchronization requirement for the UE 250 generally may maintain α 270 within ±1.5 chips. However, right after handoff, this value may sometimes be as high as ±148 chips. Under these circumstances, the UE 250 may be required to adjust α 270 at a rate of ¼ chip per 200 ms. Therefore, right after handover, the UE 250 may take up to 118.4 seconds to adjust α 270. However, drive tests in an exemplary UMTS network have revealed that, at any given instant, the most likely value of α 270 is zero.

In embodiments of the present subject matter having synchronized nodes, such synchronization may be accomplished by several alternative methods including, but not limited to, training a node's oscillator by a GPS sourced signal, tracking the signal of a neighboring node, etc. In embodiments of the present subject matter having unsynchronized nodes, the timing offset between nodes may be measured and appropriately subtracted from the respective computation described above. By way of a non-limiting example, an NSU or timing measurement unit ("TMU") may be utilized to directly estimate the timing offset. Further, another embodiment may deploy a timing bank that utilizes measurement reports from a GPS enabled mobile device to track the base station drift.

Figure 3:
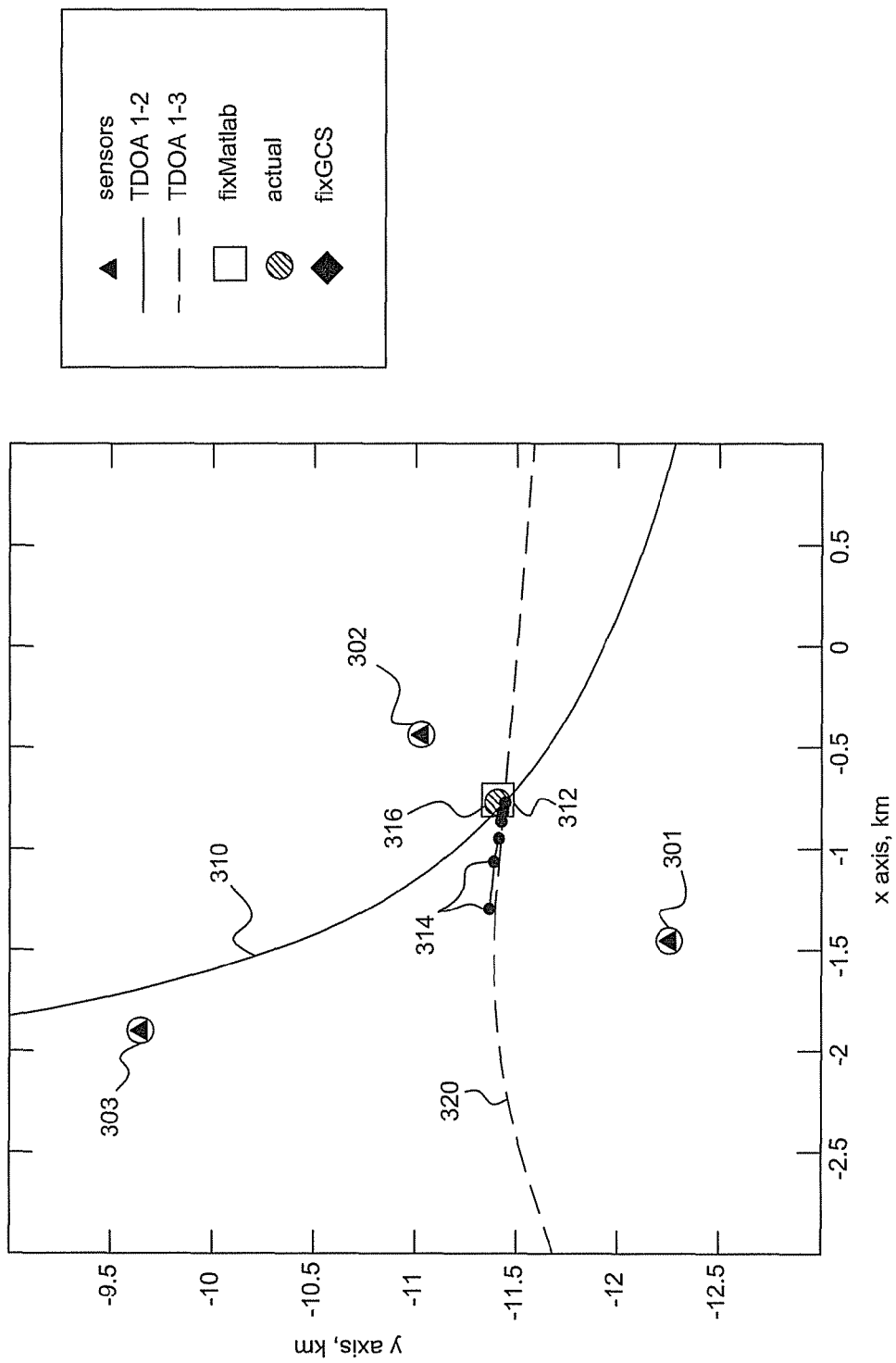
FIGS. 3 and 4 are illustrations of location determination using three CFN-SFN measurements according to embodiments of the present subject matter.
Figure 4:
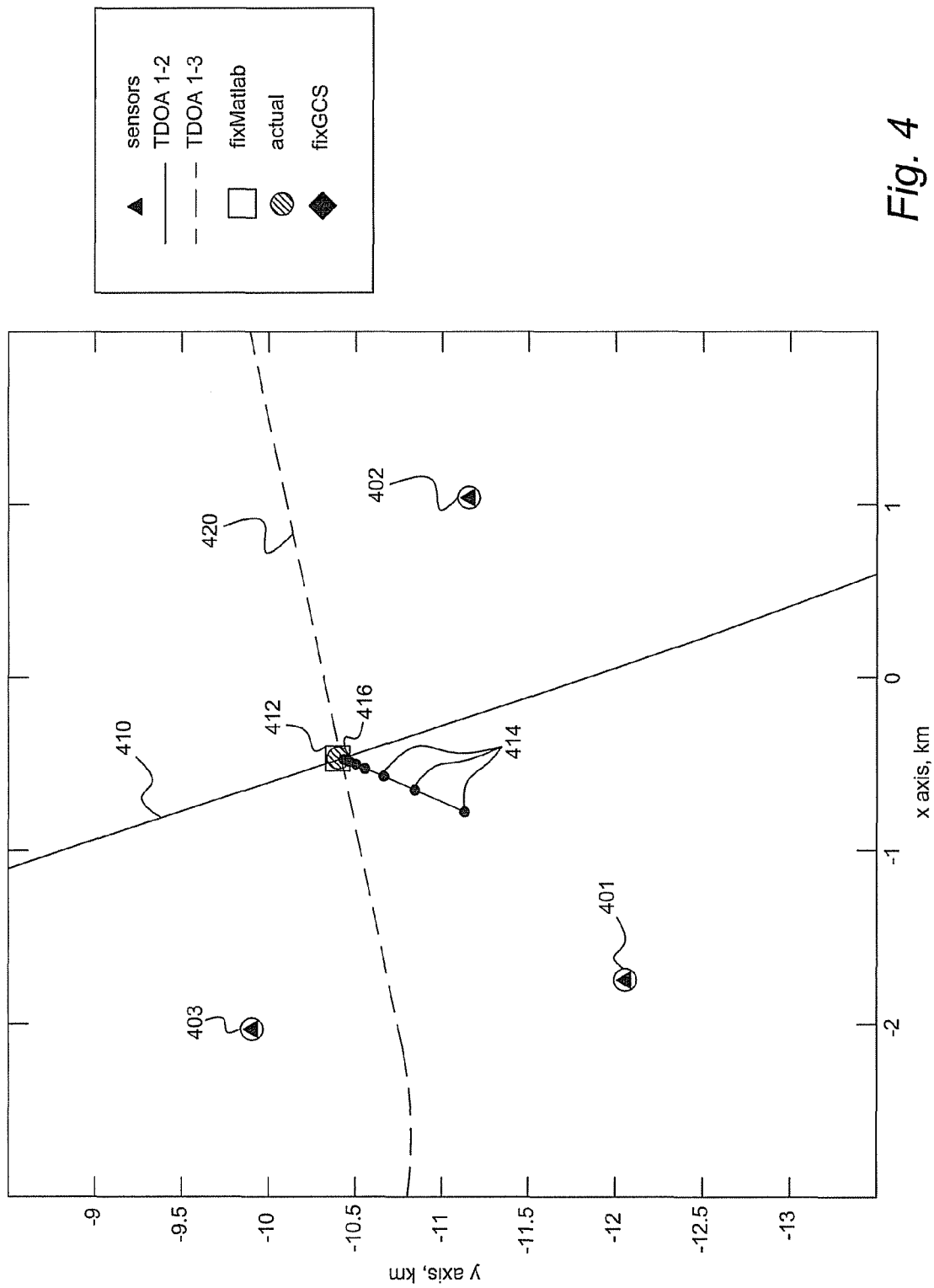

FIGS. 3 and 4 are illustrations of location determination using three CFN-SFN measurements according to embodiments of the present subject matter. With reference to FIGS. 3 and 4, an exemplary location technique of a UE according to embodiments of the present subject matter was conducted utilizing a sparse NSU deployment in a live network. With reference to FIG. 3, a first OTDOA 310 was determined as a function of values from a first node 301 and a second node 302. A second OTDOA 320 was determined as a function of values from the first node 301 and a third node 303. An estimated location of the UE was determined utilizing Matlab 312 and compared with the actual location 316 and GCS locations 314 of the UE. By way of a non-limiting example, after the OTDOA hyperbolas 310, 320 were determined, a GCS may estimate the best possible location with an iterative process represented by the GCS locations 314. These GCS locations 314 tend to converge toward the actual location 316 as the iteration progresses. In the instance that the GCS locations do not move significantly form one iteration to the next, the iteration may be considered to have converged and this location estimate may be identified as a final GCS location.

With reference to FIG. 4, a first OTDOA 410 was determined as a function of values from a first node 401 and a second node 402. A second OTDOA 420 was determined as a function of values from the first node 401 and a third node 403. An estimated location of the UE was determined utilizing Matlab 412 and compared with the actual location 416 and GCS locations 414 of the UE. By way of a non-limiting example, after the OTDOA hyperbolas 410, 420 were determined, a GCS may estimate the best possible location with an iterative process represented by the GCS locations 414. These GCS locations 414 tend to converge toward the actual location 416 as the iteration progresses. In the instance that the GCS locations do not move significantly from one iteration to the next, the iteration may be considered to have converged and this location estimate may be identified as a final GCS location.

Figure 5:
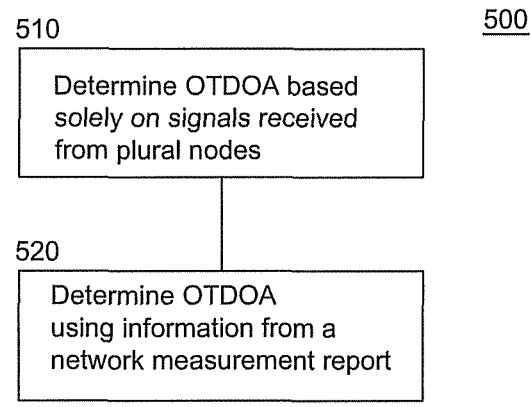
FIG. 5 is an algorithm according to one embodiment of the present subject matter.

FIG. 5 is an algorithm according to one embodiment of the present subject matter. With reference to FIG. 5, a method for estimating a location of a wireless device 500 is illustrated. At block 510, an OTDOA may be determined based solely on signals received from plural nodes and at block 520, the OTDOA may be determined using information received from a network measurement report. In one embodiment, this information may comprise a first value determined from a chip offset value. In a further embodiment, the determination of the OTDOA may include using a second value determined from an SFN from one of the nodes. Of course, the plural nodes may include a serving node and a neighboring node. In such an embodiment, the determination of the OTDOA may include utilizing a second value determined from a difference between a CFN of the serving node and a SFN of the neighboring node. In an embodiment of the present subject matter where the plural nodes include a serving node, a first neighboring node, and a second neighboring node, a determination of the OTDOA may include using a second value determined from a difference between a SFN of the first neighboring node and a SFN of the second neighboring node. The nodes may be, but are not limited to, base stations, base station sectors, and combinations thereof.

Figure 6:
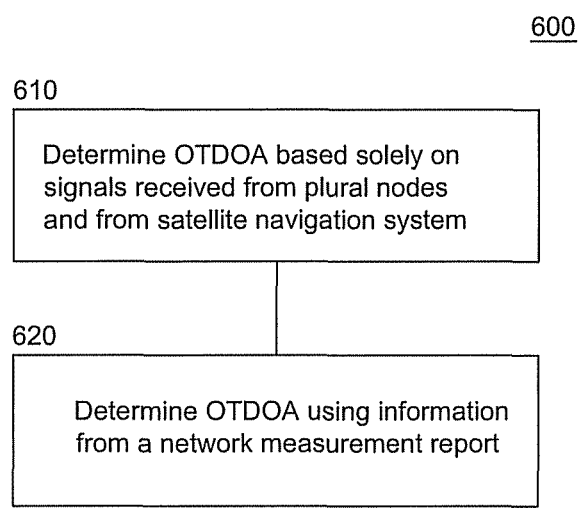
FIG. 6 is an algorithm according to a further embodiment of the present subject matter.

FIG. 6 is an algorithm according to a further embodiment of the present subject matter. With reference to FIG. 6, a method for estimating a location of a wireless device 600 is illustrated. At block 610, an OTDOA may be determined based solely on signals received from plural nodes and from signals received from a satellite navigation system. At block 620, the OTDOA may be determined using information received from a network measurement report. The nodes may be, but are not limited to, base stations, base station sectors, and combinations thereof. Further, an exemplary satellite navigation system may be, but is not limited to, Global Positioning System ("GPS"), Galileo, Global Navigation Satellite System ("GLONASS"), and Quasi-Zenith Satellite System ("QZSS").

Figure 7:
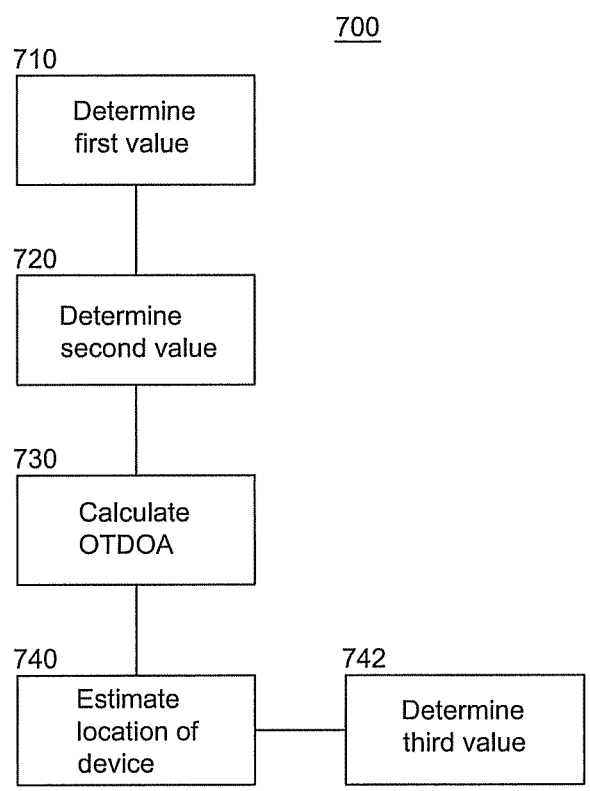
FIG. 7 is an algorithm according to another embodiment of the present subject matter.

FIG. 7 is an algorithm according to another embodiment of the present subject matter. With reference to FIG. 7, a method for estimating a location of a wireless device receiving signals from a plurality of nodes of a communication system 700 is illustrated. An exemplary wireless device may be, but are not limited to, a cellular device, text messaging device, computer, portable computer, vehicle locating device, vehicle security device, communication device, and wireless transceiver. Further, exemplary nodes may be base stations, base station sectors, and combinations thereof. Of course, the nodes may not be synchronized or may be synchronized as a function of information received from a satellite signal, or synchronized as a function of information transmitted from a component of the system. An exemplary component may be, but is not limited to, an NSU. Further, an exemplary communication system may be a UMTS network, OFDMA network WiMax network, GSM network, WiFi network, CDMA network and the systems may operate under a standard such as, but not limited to, IS-95, EDVO, CDMA2000, LTE and 1xRTT.

At block 710, a first value may be determined based on a network timing characteristic for one of the nodes. In one embodiment, the network timing characteristic may be a SFN. At block 720, a second value may be determined based on a network measurement report characteristic. In another embodiment, the network measurement report characteristic may be a chip offset value. An OTDOA hyperbola may then be calculated based on the first and second values at block 730, and at block 740, a location of the wireless device may be estimated as a function of the OTDOA hyperbola. In another embodiment of the present subject matter, at block 742, the estimation of the location of the wireless device may include determining a third value such as, but not limited to, a round trip time ("RTT") value, a cell identification value, a signal strength value, and combinations thereof.

Figure 8:
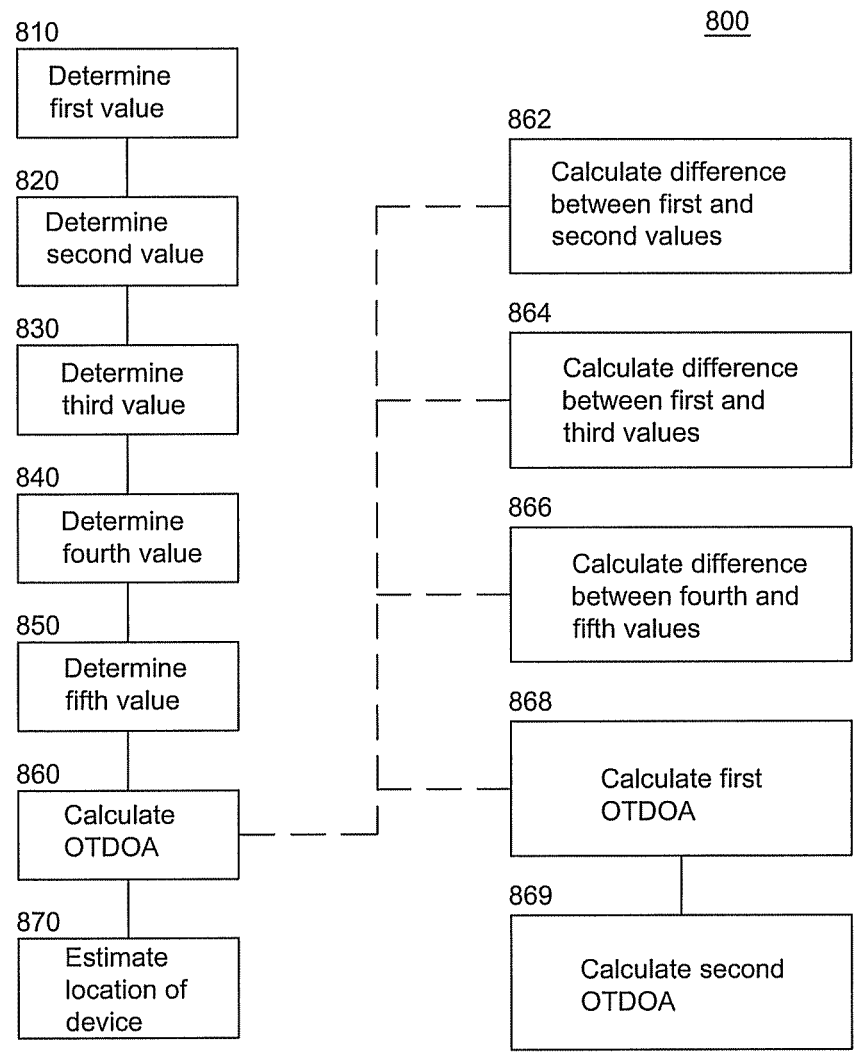
FIG. 8 is an algorithm according to yet another embodiment of the present subject matter.

FIG. 8 is an algorithm according to another embodiment of the present subject matter. With reference to FIG. 8, a method for estimating a location of a wireless device receiving signals from a serving node, a first neighboring node, and a second neighboring node, where each node is a node of a communication system 800, is illustrated. An exemplary wireless device may be, but is not limited to, a cellular device, text messaging device, computer, portable computer, vehicle locating device, vehicle security device, communication device, and wireless transceiver. Further, exemplary nodes may be base stations, base station sectors, and combinations thereof. Of course, the nodes may not be synchronized or may be synchronized as a function of information received from a satellite signal, or synchronized as a function of information transmitted from a component of the system. An exemplary component may be, but is not limited to, an NSU. Further, an exemplary communication system may be a UMTS network, WiMax network, OFDMA network, GSM network, WiFi network, CDMA network and the systems may operate under a standard such as, but not limited to, IS-95, EDVO, CDMA2000, LTE, and 1xRTT.

At block 810, a first value may be determined based upon a first network timing characteristic for the first neighboring node and at block 820, a second value may be determined based on a second network timing characteristic for the second neighboring node. A third value may be determined based on a third network timing characteristic for the serving node at block 830, and a fourth value determined based on a first network measurement report characteristic at block 840. At block 850, a fifth value may be determined based on a second network measurement report characteristic. In one embodiment of the present subject matter, the first network timing characteristic may be a SFN, the second network timing characteristic a SFN, and the third network timing characteristic a CFN. In a further embodiment of the present subject matter, the first network measurement report characteristic may be a chip offset between the serving node and the first neighboring node and the second network measurement report characteristic may be a chip offset between the serving node and the second neighboring node.

An OTDOA hyperbola may then be calculated based on at least one of the first, second, third, fourth, or fifth values at block 860, and at block 870 a location of the wireless device estimated as a function of the OTDOA hyperbola. In a further embodiment, at block 862, the calculation of the OTDOA hyperbola may include calculating a difference between the first and second values. In another embodiment, at block 864, the calculation of the OTDOA hyperbola may include calculating a difference between the first and third values. At block 866, the calculation of the OTDOA hyperbola may also include calculating a difference between the fourth and fifth values. In yet another embodiment, the calculation of the OTDOA hyperbola may include calculating a first OTDOA hyperbola based on at least one of the first or second values, and at least on one of the fourth or fifth values at block 868, and calculating a second OTDOA hyperbola based on at least one of the first or third values, and on the fourth value at block 869. Of course, the estimation of the location of the wireless device may also include determining another value such as, but not limited to, an RTT value, a cell identification value, a signal strength value, and combinations thereof.

Figure 9:
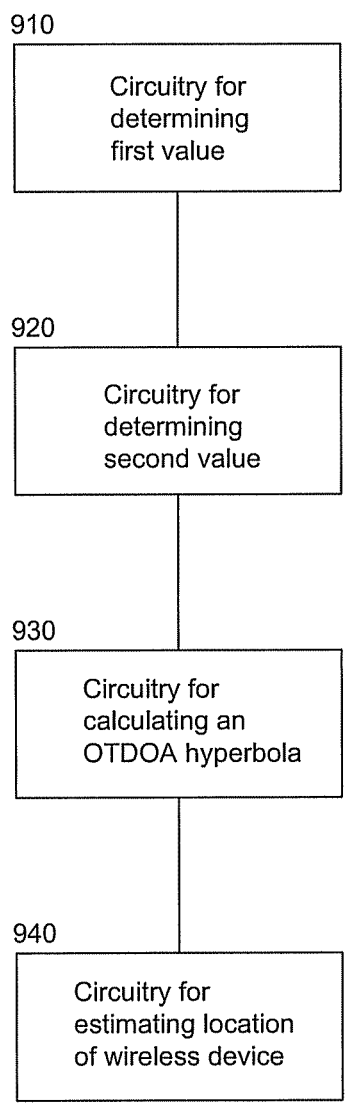
FIG. 9 is a schematic illustration of a communications system according to an embodiment of the present subject matter.

FIG. 9 is an illustration of a communications system according to an embodiment of the present subject matter. With reference to FIG. 9, a system 900 is illustrated for estimating a location of a wireless device receiving signals from a plurality of nodes of a communication system. An exemplary wireless device may be, but is not limited to, a cellular device, text messaging device, computer, portable computer, vehicle locating device, vehicle security device, communication device, and wireless transceiver. The system 900 may be a UMTS network, WiMax network, GSM network, OFDMA network, WiFi network, or CDMA network and may operate under a standard such as, but not limited to, IS-95, EDVO, LTE, CDMA2000, and 1×RTT.

The system may comprise circuitry for determining a first value based on a network timing characteristic for one of the nodes 910 and circuitry for determining a second value based on a network measurement report characteristic 920. An exemplary network timing characteristic may be a SFN. An exemplary network measurement report characteristic may be a chip offset value. An exemplary node may be a base station, base station sector, or combinations thereof. The nodes may be unsynchronized or may be synchronized as a function of information received from a network source or satellite signal. The system may further comprise circuitry for calculating an OTDOA hyperbola based on the first and second values 930 and circuitry for estimating a location of the wireless device as a function of the OTDOA 940. While not shown, the system 900 may also include an NSU.

It is therefore an aspect of embodiments of the present subject matter to derive hyperbolas between two or more nodes such as neighboring and/or serving nodes or cells using the knowledge of base station SFN timing and the CFN-SFN measurements at a UE. It is another aspect of embodiments of the present subject matter to utilize location information provided by the hyperbolas as a component of a hybrid solution method that uses other location techniques such as Cell-ID, E-CID, RTT, A-GPS, UTDOA, and/or RSSI based techniques.

As shown by the various configurations and embodiments illustrated in FIGS. 1-9, a system and method for locating UMTS user equipment using measurement reports have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for estimating a location of a wireless device receiving signals from a plurality of nodes of a communication system, the method comprising:
    (a) determining a first value based on a network timing characteristic for one of said nodes;
    (b) determining a second value based on a network measurement report characteristic;
    (c) calculating an observed time difference of arrival ("OTDOA") hyperbola based on said first and second values; and
    (d) estimating a location of said wireless device as a function of said OTDOA hyperbola,
    wherein said plural nodes include a serving node and a neighboring node and wherein the calculating of the OTDOA includes using a second value determined from a difference between a connection frame number ("CFN") of said serving node and a system frame number ("SFN") of said neighboring node, and
    wherein the estimating of the location of said wireless device includes determining a third value selected from the group consisting of: a round trip time ("RTT") value, a cell identification value, a signal strength value, and combinations thereof.

2. The method of claim 1 wherein said wireless device is selected from the group consisting of: cellular device, text messaging device, computer, portable computer, vehicle locating device, vehicle security device, communication device, and wireless transceiver.

3. The method of claim 1 wherein said nodes are selected from the group consisting of: base stations, base station sectors, and combinations thereof.

4. The method of claim 1 wherein said communication system is selected from the group consisting of: Universal Mobile Telecommunications System ("UMTS") network, Worldwide Interoperability for Microwave Access ("WiMax") network, Global System for Mobile Communications ("GSM") network, Orthogonal Frequency Division Multiple Access ("OFDMA") network, WiFi network, and Code Division Multiple Access ("CDMA") network.

5. The method of claim 4 wherein said system operates under a standard selected from the group consisting of: IS-95, Evolution-Data Optimized ("EDVO"), CDMA2000, Long Term Evolution ("LTE") and 1 times Radio Transmission Technology ("1×RTT").

6. The method of claim 1 wherein said network timing characteristic is a frame offset.

7. The method of claim 6 wherein said frame offset is a system frame number ("SFN").

8. The method of claim 1 wherein said network measurement report characteristic is a time offset value.

9. The method of claim 8 wherein said time offset value is selected from the group consisting of: chip offset value and sample offset value.

10. The method of claim 1 wherein said nodes are not synchronized.

11. The method of claim 1 wherein said nodes are synchronized as a function of information received from a satellite signal.

12. The method of claim 1 wherein said nodes are synchronized as a function of information transmitted from a component of said system.

13. The method of claim 12 wherein said component is a network synchronization unit ("NSU").

14. The method of claim 13 wherein said NSU directly estimates the network measurement report characteristic.

15. A system for estimating a location of a wireless device receiving signals from a plurality of nodes of a communication system, comprising:
   circuitry for determining a first value based on a network timing characteristic for one of said nodes;
   circuitry for determining a second value based on a network measurement report characteristic;
   circuitry for calculating an observed time difference of arrival ("OTDOA") hyperbola based on said first and second values; and
   circuitry for estimating a location of said wireless device as a function of said OTDOA,
   wherein said plural nodes include a serving node and a neighboring node and wherein said circuitry for calculating the OTDOA includes circuitry for using a second value determined from a difference between a connection frame number ("CFN") of said serving node and a system frame number ("SFN") of said neighboring node, and
   wherein said circuitry for estimating the location of said wireless device includes circuitry for determining a third value selected from the group consisting of: a round trip time ("RTT") value, a cell identification value, a signal strength value, and combinations thereof.

16. The system of claim 15 including a network synchronization unit.

17. The system of claim 15 wherein said wireless device is selected from the group consisting of: cellular device, text messaging device, computer, portable computer, vehicle locating device, vehicle security device, communication device, and wireless transceiver.

18. The system of claim 15 wherein said nodes are selected from the group consisting of: base stations, base station sectors, and combinations thereof.

19. The system of claim 15 wherein said communication system is selected from the group consisting of: Universal Mobile Telecommunications System ("UMTS") network, Worldwide Interoperability for Microwave Access ("WiMax") network, Orthogonal Frequency Division Multiple Access ("OFDMA"), Global System for Mobile Communications ("GSM") network, WiFi network, and Code Division Multiple Access ("CDMA") network.

20. The system of claim 19 wherein said system operates under a standard selected from the group consisting of: IS-95, Long Term Evolution ("LTE"), Evolution-Data Optimized ("EDVO"), CDMA2000, and 1 times Radio Transmission Technology ("1xxRTT").

21. The system of claim 15 wherein said network timing characteristic is a frame offset.

22. The system of claim 21 wherein said frame offset is a system frame number ("SFN").

23. The system of claim 15 wherein said network measurement report characteristic is a time offset value.

24. The system of claim 23 wherein said time offset value is selected from the group consisting of: chip offset value, sample offset value.

25. The system of claim 15 wherein said nodes are not synchronized.

26. The system of claim 15 wherein said nodes are synchronized as a function of information received from a satellite signal.

27. The system of claim 15 wherein said nodes are synchronized as a function of information transmitted from a component of said system.

28. A method for estimating a location of a wireless device receiving signals from a plurality of nodes of a communication system, the method comprising:
   (a) determining a first value based on a network timing characteristic for one of said nodes;
   (b) determining a second value based on a network measurement report characteristic;
   (c) calculating an observed time difference of arrival ("OTDOA") hyperbola based on said first and second values; and
   (d) estimating a location of said wireless device as a function of said OTDOA hyperbola,
   wherein said plural nodes include a serving node, a first neighboring node, and a second neighboring node, and wherein the calculating of the OTDOA includes using a second value determined from a difference between a system frame number ("SFN") of said first neighboring node and a SFN of said second neighboring node, and
   wherein the estimating of the location of said wireless device includes determining a third value selected from the group consisting of: a round trip time ("RTT") value, a cell identification value, a signal strength value, and combinations thereof.

29. The method of claim 28 wherein said wireless device is selected from the group consisting of: cellular device, text messaging device, computer, portable computer, vehicle locating device, vehicle security device, communication device, and wireless transceiver.

30. The method of claim 28 wherein said nodes are selected from the group consisting of: base stations, base station sectors, and combinations thereof.

31. The method of claim 28 wherein said communication system is selected from the group consisting of: Universal Mobile Telecommunications System ("UMTS") network, Worldwide Interoperability for Microwave Access ("WiMax") network, Global System for Mobile Communications ("GSM") network, Orthogonal Frequency Division Multiple Access ("OFDMA") network, WiFi network, and Code Division Multiple Access ("CDMA") network.

32. The method of claim 31 wherein said system operates under a standard selected from the group consisting of: IS-95, Evolution-Data Optimized ("EDVO"), CDMA2000, Long Term Evolution ("LTE") and 1 times Radio Transmission Technology ("1xRTT").

33. The method of claim 28 wherein said network timing characteristic is a frame offset.

34. The method of claim 33 wherein said frame offset is a system frame number ("SFN").

35. The method of claim 28 wherein said network measurement report characteristic is a time offset value.

36. The method of claim 35 wherein said time offset value is selected from the group consisting of: chip offset value and sample offset value.

37. The method of claim 28 wherein said nodes are not synchronized.

38. The method of claim 28 wherein said nodes are synchronized as a function of information received from a satellite signal.

39. The method of claim 28 wherein said nodes are synchronized as a function of information transmitted from a component of said system.

40. The method of claim 39 wherein said component is a network synchronization unit ("NSU").

41. The method of claim 40 wherein said NSU directly estimates the network measurement report characteristic.

42. A system for estimating a location of a wireless device receiving signals from a plurality of nodes of a communication system, comprising:
   circuitry for determining a first value based on a network timing characteristic for one of said nodes;
   circuitry for determining a second value based on a network measurement report characteristic;
   circuitry for calculating an observed time difference of arrival ("OTDOA") hyperbola based on said first and second values; and
   circuitry for estimating a location of said wireless device as a function of said OTDOA,
   wherein said plural nodes include a serving node, a first neighboring node, and a second neighboring node, and wherein said circuitry for calculating the OTDOA includes circuitry for using a second value determined from a difference between a system frame number ("SFN") of said first neighboring node and a SFN of said second neighboring node, and
   wherein said circuitry for estimating the location of said wireless device includes circuitry for determining a third value selected from the group consisting of: a round trip time ("RTT") value, a cell identification value, a signal strength value, and combinations thereof.

43. The system of claim 42 including a network synchronization unit.

44. The system of claim 42 wherein said wireless device is selected from the group consisting of: cellular device, text messaging device, computer, portable computer, vehicle locating device, vehicle security device, communication device, and wireless transceiver.

45. The system of claim 42 wherein said nodes are selected from the group consisting of: base stations, base station sectors, and combinations thereof.

46. The system of claim 42 wherein said communication system is selected from the group consisting of: Universal Mobile Telecommunications System ("UMTS") network, Worldwide Interoperability for Microwave Access ("WiMax") network, Orthogonal Frequency Division Multiple Access ("OFDMA"), Global System for Mobile Communications ("GSM") network, WiFi network, and Code Division Multiple Access ("CDMA") network.

47. The system of claim 46 wherein said system operates under a standard selected from the group consisting of: IS-95, Long Term Evolution ("LTE"), Evolution-Data Optimized ("EDVO"), CDMA2000, and 1 times Radio Transmission Technology ("1xRTT").

48. The system of claim 42 wherein said network timing characteristic is a frame offset.

49. The system of claim 48 wherein said frame offset is a system frame number ("SFN").

50. The system of claim 42 wherein said network measurement report characteristic is a time offset value.

51. The system of claim 50 wherein said time offset value is selected from the group consisting of: chip offset value, sample offset value.

52. The system of claim 42 wherein said nodes are not synchronized.

53. The system of claim 42 wherein said nodes are synchronized as a function of information received from a satellite signal.

54. The system of claim 42 wherein said nodes are synchronized as a function of information transmitted from a component of said system.

* * * * *